Patented Oct. 11, 1932

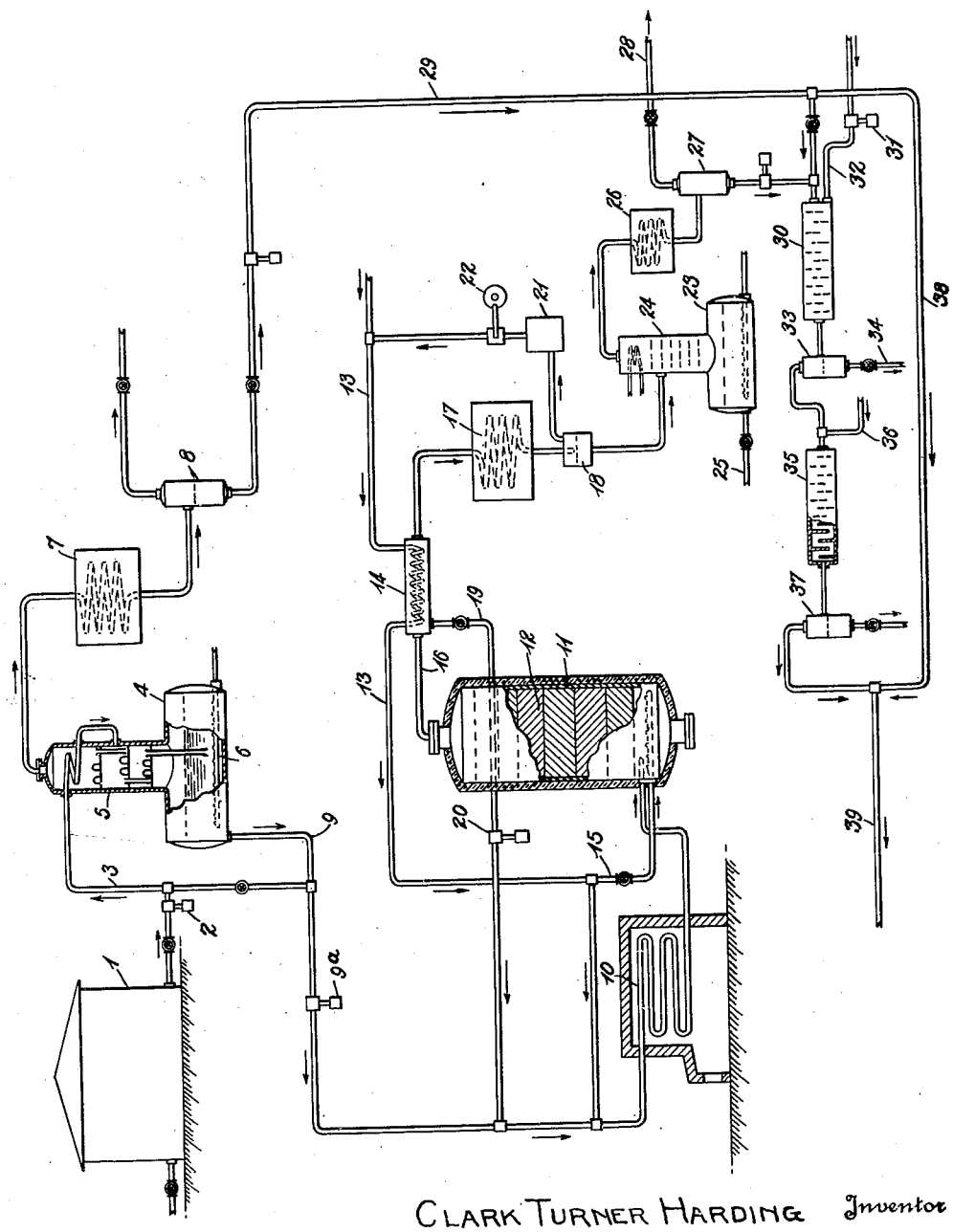

1,881,534

UNITED STATES PATENT OFFICE

CLARKE TURNER HARDING, OF BATON ROUGE, LOUISIANA, ASSIGNOR TO STANDARD-I. G. COMPANY

PROCESS OF REFINING HYDROCARBON OILS

Application filed August 31, 1929. Serial No. 389,686.

The present invention relates to the art of treating light hydrocarbon distillates and more specifically to an improved method of purifying hydrocarbon distillates such as naphtha to produce a finished oil suitable for use as a high grade motor fuel. The present invention will be fully understood from the following description and the drawing which illustrates one form of apparatus suitable for my purpose.

The drawing is a semi-diagrammatic view in sectional elevation of an apparatus constructed according to my invention.

The present process is an improvement over the processes disclosed in the following co-pending applications which deal with various methods for treatment of non-viscous distillates with hydrogen under high pressure: Serial No. 389,628 filed August 31, 1929 by James M. Jennings, Serial No. 389,680 filed August 31, 1929 by Garland H. Davis, Serial No. 389,717 filed August 31, 1929 by Robert P. Russell. My process is an improvement in the method of treating such oils and may be applied to the methods proposed by each of the inventors enumerated above.

Referring to the drawing reference character 1 denotes a storage tank containing the light distillate to be treated, which contains fractions of boiling range suitable for motor fuel either together with heavier oils or alone. The oil may, for example, comprise a pressure distillate. The feed oil may be forced by pump 2 through line 3 to still 4 which is fitted with a tower 5. The tower may be of any particular design but is preferably of the bell cap plate type. The still is heated in any preferred manner and live steam through pipe 6 may be used to assist distillation. The light vaporized oil is conducted to condenser 7 and receiver 8.

Vaporized oil from still 4 is passed through line 9 or the total original feed may be so fed using by-pass line 3a, into and through a heating coil 10 and into the reactor drum 11. The coil and drum are adapted to withstand high internal pressure and high temperature as well as the corrosive effects of oil and free hydrogen. The drum 11 is preferably packed with a suitable catalytic material 12 in lump form or supported in any suitable manner. Hydrogen or a gas relatively rich in free hydrogen is forced in by way of line 13 and may be preheated in exchanger 14 from which it flows into the inlet of coil 10. A part of the hydrogen may be added directly to the drum by line 15.

Vapor flows from the drum by vapor line 16 to exchanger 14 and thence to condenser 17 and separator drum 18. Partial condensate from exchanger 14 may be returned by line 19 and pump 20 to inlet of coil 10 for retreatment, or may be withdrawn with the vaporous product. The gas from drum 18 is withdrawn, purified in a suitable purification system shown generally at 21, recompressed by compressor 22 and returned to line 13 for reuse. The liquid is conducted to still 23 operating at a much reduced pressure. Tower 24 may be similar to tower 5. The unvaporized oil is removed from still 23 to storage (not shown) by line 25 while the vapor is conducted to condenser 26 and separator 27 from which gas is vented by line 28.

The treated oil is then preferably blended with the light distillate from drum 8 which is withdrawn by line 29 and the blend may be washed with aqueous alkali or any other suitable purifying agent in a treater 30 adapted for continuous treatment. The treater is preferably a baffled passage causing thorough agitation of the oil with the treating agent forced in by means of pump 31 and line 32. The oil and treating agent are allowed to separate in drum 33, the spent agent being withdrawn to the sewer by line 34 and the oil being transferred to a second stage of treatment, such as a water wash in a second treating unit 35 similar to 30. The second treating agent, for example water, enters the line 36 and the oil is separated in drum 37. If desired, only the oil from drum 18 need be given the finishing treatment and the light product from drum 8 may be added by means of line 38. In any case, the blended oil is conducted to storage (not shown) by line 39.

In the operation of my process I have discovered that it is frequently desirable to treat only the heavier fractions of a light distillate, either naphtha or kerosene since the sulphur and gum are often to a marked degree concentrated in the heavier fractions. The treatment may be carried out in a variety of ways in which temperature may vary from 500° up to 950° F. or even higher. The quantity of hydrogen and the partial pressure of the same may also be varied over wide ranges depending on whether a completely saturated product is desired, as in the case of kerosene. The volume of hydrogen should be upward from 3000 cu. ft. per barrel of oil treated and is generally considerably more. The time of contact may also be varied, low rates of flow below about 1 volume of oil per hour per volume of reactor space where temperature is below about 750° F. and may be either above or below this rate at higher temperatures depending on the nature of the improvement desired. Catalyst such as the oxides of the sixth group of the periodic system of elements may be used with or without other oxides or sulphides of materials such as zinc, alumina and the like.

I have found it desirable to remove the lighter oil up to, say 200° F. or 250° F. or 300° F. to produce a distillate which is sufficiently low in sulphur and its compounds to either pass the doctor and/or corrosion tests or which can be made to do so either with alkali or doctor but which do not require acid treatment. The actual amount of the cut depends on the nature of the crude cut or cracked oil cut and it cannot be definitely stated at what temperature the cut should be made but it is a relatively simple matter to fractionate the oil into, say 10% cuts and to determine by test what particular fractions may be by-passed and which must be subjected to hydrogen treatment, according to the specifications. When this has been determined the oil is distilled and the bottom is subjected to the requisite high pressure hydrogen treatment under the conditions above stated. The low boiling oil may then be blended with the treated oil and the blend washed with alkali and rerun or the oils may be separately washed and/or rerun and afterwards blended. The by-passed oil in many cases needs no treatment at all.

One application of my method is particularly advantageous namely the treatment of a cracked distillate such as pressure still distillate which contains naphtha fractions and higher fractions which because of their high boiling points are unsuitable for motor fuel. This distillate contains the lighter gas oil fractions. Of this cut 10 to 30% or even more of the light oil, boiling below 200 or 300° F. may be distilled and needs no treatment, except perhaps an alkali wash to pass sulphur, gum and corrosion specifications. The remainder containing the gas oil cut is then treated at a temperature above, say 870° F. or 900° F. with hydrogen at pressure above about 50 atmospheres pressure. The treated oil is washed with alkali and blended with the by-passed oil and may then be rerun to, say 400° F. end point. The volume of 400° F. end point gasoline is found to be much greater than can be obtained from the original distillate by rectification and the oil obtained will pass doctor, gum and sulphur specifications. A large part of the oil boiling above 400° F. is converted to distillates within the gasoline range. The loss due to gas productions is much decreased by my method and greater volumes of oil may be treated. This process may be applied to uncracked distillates as well, which contain light gas oil fractions boiling up to, say 550° or 600° F. The finished gasoline needs no acid treatment.

My process is not to be limited to any theory of the mechanism of the process nor to any example given merely by way of illustration but only by the following claims in which I wish to claim all novelty inherent in the invention.

I claim:

1. An improved process for the purification of hydrocarbon distillates which comprises separating the oil into a distillate and a residue consisting of fractions normally requiring acid treatment, subjecting the residue to treatment with hydrogen at a temperature above 500° F. and at a pressure above 20 atmospheres, blending the distillate with such hydrogen treated residue.

2. Process according to claim 1 in which the blend is redistilled to produce an oil of not over about 437° F. end point.

3. Process according to claim 1 in which the oil fractions subjected to high pressure hydrogen treatment comprise those boiling above about 300° F.

4. Process according to claim 1 in which the oil fractions subjected to high pressure hydrogen treatment are those boiling above about 200° F.

5. An improved process for producing motor fuel from distillate hydrocarbon mixtures, comprising separating the mixture by distillation into a distillate and a residue consisting of fractions normally requiring acid treatment, subjecting the residue to treatment with hydrogen at a temperature above 700° F., and at a pressure in excess of 50 atmospheres, blending the distillate with such hydrogen treated residue and rerunning to an end point below about 437° F.

6. Process according to claim 5 in which the original distillate treated contains fractions boiling above 437° F.

7. Process according to claim 5 in which the original distillates treated contains fractions boiling above 500° F.

8. Process according to claim 5 in which the original oil distillate is a cracked distillate.

9. An improved process for the purification of hydrocarbon distillate of the kerosene type, which comprises separating the oil into a distillate and a residue consisting of fractions normally requiring acid treatment, subjecting the residue to treatment with hydrogen at a temperature above 500° F. and at a pressure above 50 atmospheres, blending the distillate with such hydrogen treated residue to produce a balanced burning oil.

10. An improved process for treating hydrocarbon oils comprising removing fractions boiling below about 250° F. and capable of passing sulphur and gum specifications, subjecting residual oil containing fractions boiling upwards of 400° F. and incapable of passing such specifications to hydrogen treatment at temperature above about 870° F. and pressure in excess of 50 atmospheres whereby the oil is reduced in boiling point to within the motor fuel range and rendered capable of passing such specifications, and blending the treated and untreated fractions.

11. An improved process for obtaining large yields of motor fuels from oil distillates, comprising subjecting a wide cut distillate containing fractions boiling below 300° F. and above 500° F. to distillation whereby low boiling liquid fractions capable of meeting sulphur specifications are segregated, destructively hydrogenating the higher boiling fractions under conditions of temperature and pressure and for a time whereby the oil is substantially completely reduced to a boiling range within the range of motor fuels and rendered capable of passing sulphur specifications, and blending the treated and untreated oils in suitable proportions for a balanced motor fuel.

CLARKE TURNER HARDING.